United States Patent [19]
Brainard, II

[11] 4,158,306
[45] Jun. 19, 1979

[54] WAVE DIRECTION MEASUREMENT AND RECORDING

[75] Inventor: Edward C. Brainard, II, Marion, Mass.

[73] Assignee: Environmental Devices Corporation, Marion, Mass.

[21] Appl. No.: 868,619

[22] Filed: Jan. 11, 1978

[51] Int. Cl.² ............................................. G01W 1/00
[52] U.S. Cl. .................................................. 73/170 A
[58] Field of Search ......................... 73/170 A; 9/8 R

[56] References Cited

U.S. PATENT DOCUMENTS

| 427,480 | 5/1890 | Paine | 9/8 R |
|---|---|---|---|
| 2,381,394 | 8/1945 | Beach | 9/8 R |
| 3,367,181 | 2/1968 | Adler | 73/170 A |

Primary Examiner—Anthony V. Ciarlante
Attorney, Agent, or Firm—Kenway & Jenney

[57] ABSTRACT

In the apparatus disclosed herein, a floating spar tethered at its midpoint is employed to determine wave direction. The balance of wave forces acting upon the spar tend to orient it parallel to passing surface wave fronts. A recording compass then determines and records the orientation of the spar.

10 Claims, 4 Drawing Figures

WAVE DIRECTION MEASUREMENT AND RECORDING

BACKGROUND OF THE INVENTION

The present invention relates to wave direction measurement and more particularly to an apparatus which will orient itself in predictable manner with respect to a passing surface wave front.

Various oceanographic instruments have been devised theretofore for measuring ocean currents as well as the state of the surface sea. Measurement of surface wave direction, however, has remained a relatively complex task, however, typically involving floats extending on multiple axes and/or an analysis of spectra generated by float or bottom mounted pressure sensors.

At the outset, it should be understood that the parameter or phenomenon which is to be measured and recorded is the direction of surface waves on a body of water and that this measurement is preferably made essentially independently of other parameters such as wind direction and tidal currents. Although wind and tidal currents may be factors influencing the direction of the surface waves, the surface waves may not be coincident with either of these factors or even a predictable combination of them. It is useful to measure and record wave direction patterns independently of current and wind since wave patterns can substantially affect matters such as beach erosion and sea damage to piers, drilling rigs, pipelines and the like.

Among the several objects of the present invention may be noted the provision of wave direction measuring apparatus which will determine the direction of surface wave fronts essentially independently of wind and tide; the provision of such apparatus which determines surface wave direction relative to a fixed frame of reference, e.g. magnetic north; the provision of such apparatus which is inherently sturdy and does not require multiple floats and the like; the provision of such apparatus which is highly reliable and which is of relatively simple and inexpensive construction. Other objects and features will be in part apparent and in part pointed out hereinafter.

SUMMARY OF THE INVENTION

In general, the apparatus of the present invention is predicated upon the discovery that a floating spar tethered near its midpont will orient itself parallel to passing surface wave fronts. While the complex of forces acting on such a spar are not fully understood, it appears that the crest of an approaching wave front tends to carry the nearer end of such a spar with it until the spar is generally parallel to the wave front. Further, it appears that this orienting tendency is sufficiently forceful so that the orientation of the spar is determined essentially solely by the direction of wave fronts and is relatively independent of the direction of wind direction and tidal flow. These influences may, of course, affect the direction or angle at which the tether approaches the floating spar.

While the center tethered spar of the present invention will reliably orient parallel to passing surface wave fronts, it will be recognized that there is a possible 180° ambiguity in the measurement obtained. In many cases it will be desirable to resolve this ambiguity. In accordance with a further aspect of the invention, it has been found that the spar tends to roll away from the passing wave front. This tendency provides a means for resolving the latent ambiguity. By providing, within the spar, a pendulum which can pivot around an axis parallel to the spar's length a signal may be generated which represents this roll. Recording the direction of the roll along with the compass reading provides an unambiguous output.

Briefly, apparatus according to the present invention for detecting the direction of surface waves on a body of water employs a buoyant elongate spar and means for tethering that spar so as to apply a restraining force essentially through the midpoint of the spar's length. Compass means are carried by the spar for providing a signal representing the orientation of the spar. Accordingly, the signal provides an indication of the direction of surface waves which orient the spar.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
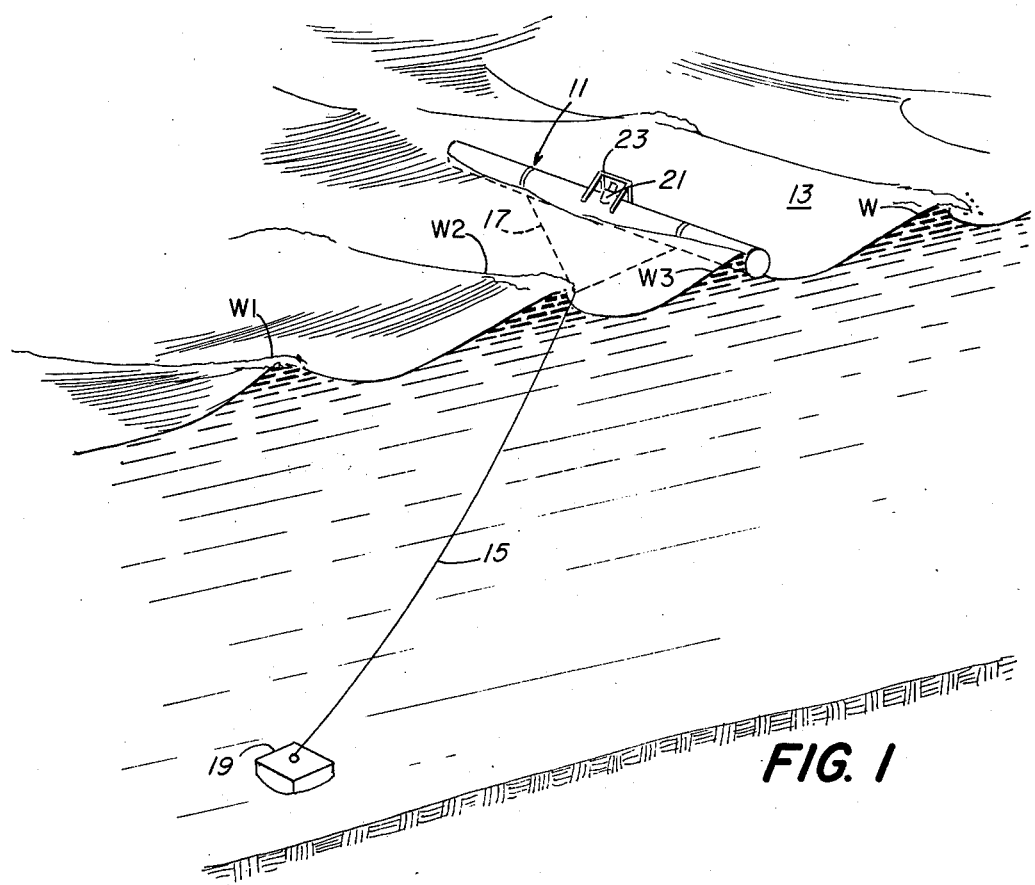
FIG. 1 is a somewhat diagrammatic illustration of a floating spar sensor construction in accordance with the present invention, tethered and anchored in a body of water so as to be responsive to surface wave fronts as indicated.

Referring now to FIG. 1, there is indicated at 11 generally an elongate buoyant spar floating in a body of water 13. Spar 11 is tethered, essentially at its midpoint, by means of an anchor chain 15 which is attached to the spar by a yoke or bridle 17 and which is secured at its lower end to a suitable anchor 19. For collision avoidance, the spar 11 is preferably provided with an anticollision stroke light 21 together with a suitable protecting framework 23. Ballast 20 is provided to bias the spar toward an upright position.

A succession of surface waves or wave front are indicated at W1-W4. It has been found that the passage of these wave fronts past the tethered spar 11 tends to orient the spar parallel to the wave fronts as shown. This orientation occurs reliably even though there may be a transverse wind or current. As will be understood, such a wind or current may cause the spar to move relative to the anchor 19 so that the tether 15 does not lead away from the spar in the direction perpendicular to the spar's length. In other words, the orientation of the tether 15 may be responsive to wind and current influences but the orientation of the spar itself will tend to be largely independent of these influences.

In one preferred embodiment, the spar was a fiberglass reinforced tube about 19 feet long and 9 inches in diameter. Lengths in the order of 5 to 30 feet are believed appropriate as are diameters in the range of 0.5 to 2.0 feet. The displacement of the buoy should be less than 50% of its volume for proper operation, an optimum volume/displacement ratio being 10:1.

Figure 2:
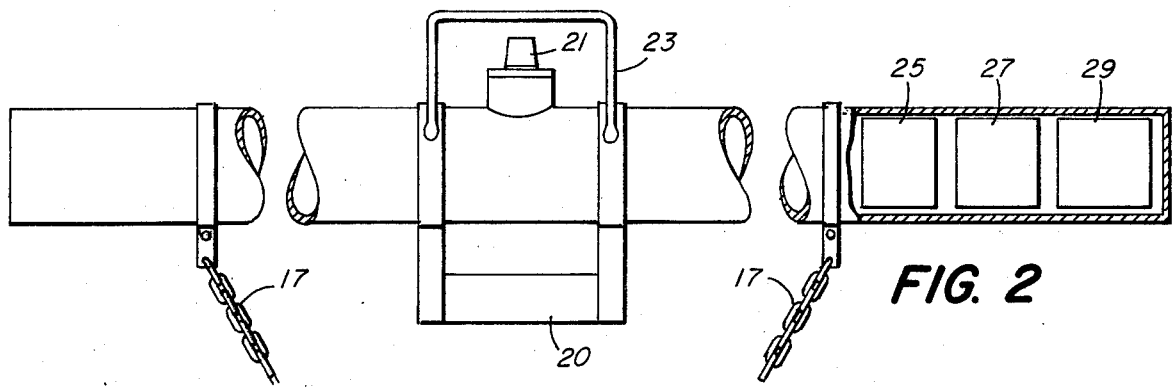
FIG. 2 is a side view showing the floating spar with portions broken away to show internal components.

To provide signals indicative of the orientation of the spar 11, the spar carries an electronic compass, indicated at 25 in FIG. 2, a pendulum sensor 27, and a strip chart recorder 29 which records signals provided by the compass and pendulum sensor so as to provide a record of the spar's behavior in response to sea conditions.

A preferred form of electronic compass is the Model #1248 manufactured by Aanderaa Instruments whose address is Fanaveien 13, 5050 Nesttun, Norway. This compass is available in the United States through the Electrical Product Development Division of AMF, 3001 Centerville Rd., Herndon, Va. 22070. This compass is a magnetic compass in which the compass card carries a potentiometer wiper. Ordinarily the wiper is not in contact with the resistance element and thus the card can freely orient itself with the earth's magnetic field in conventional manner. However, upon energization of a solenoid, the wiper is caused to be engaged with the resistance element so that a signal voltage is generated, which voltage is then an indication of the compass reading at the moment. The compass is, in other words, designed for periodic reading. The compass itself is suitably gimbaled so as to be usable in the floating spar enviroment described herein.

Figure 3:
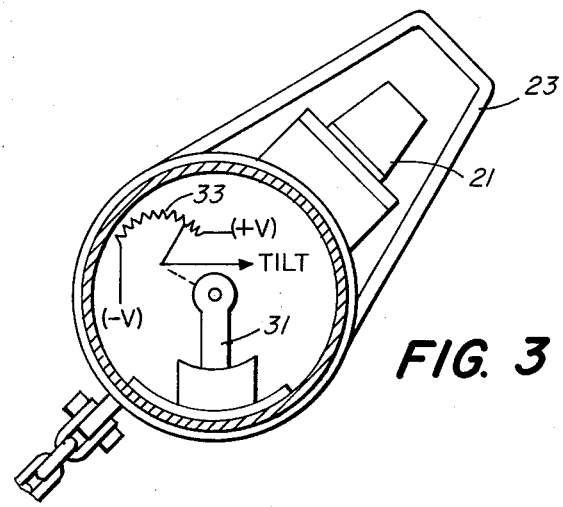
FIG. 3 is a transverse cross-sectional view of the spar showing diagrammatically the arrangement of a pendulum sensor therein.

As explained previously, the spar tends to roll away from the incoming wave front and this roll is utilized in the preferred practice of the present invention to eliminate possible ambiguity in the compass reading. In FIG. 3 there is indicated diagrammatically a pendulum 31 which is free to pivot around an axis parallel to the length of the spar. Preferably, appropriate viscous damping is applied to minimize useless flopping of the pendulum. Pendulum 31 is coupled to a potentiometer 33 so as to generate a signal voltage, designated TILT, which represents the roll of the spar.

Figure 4:
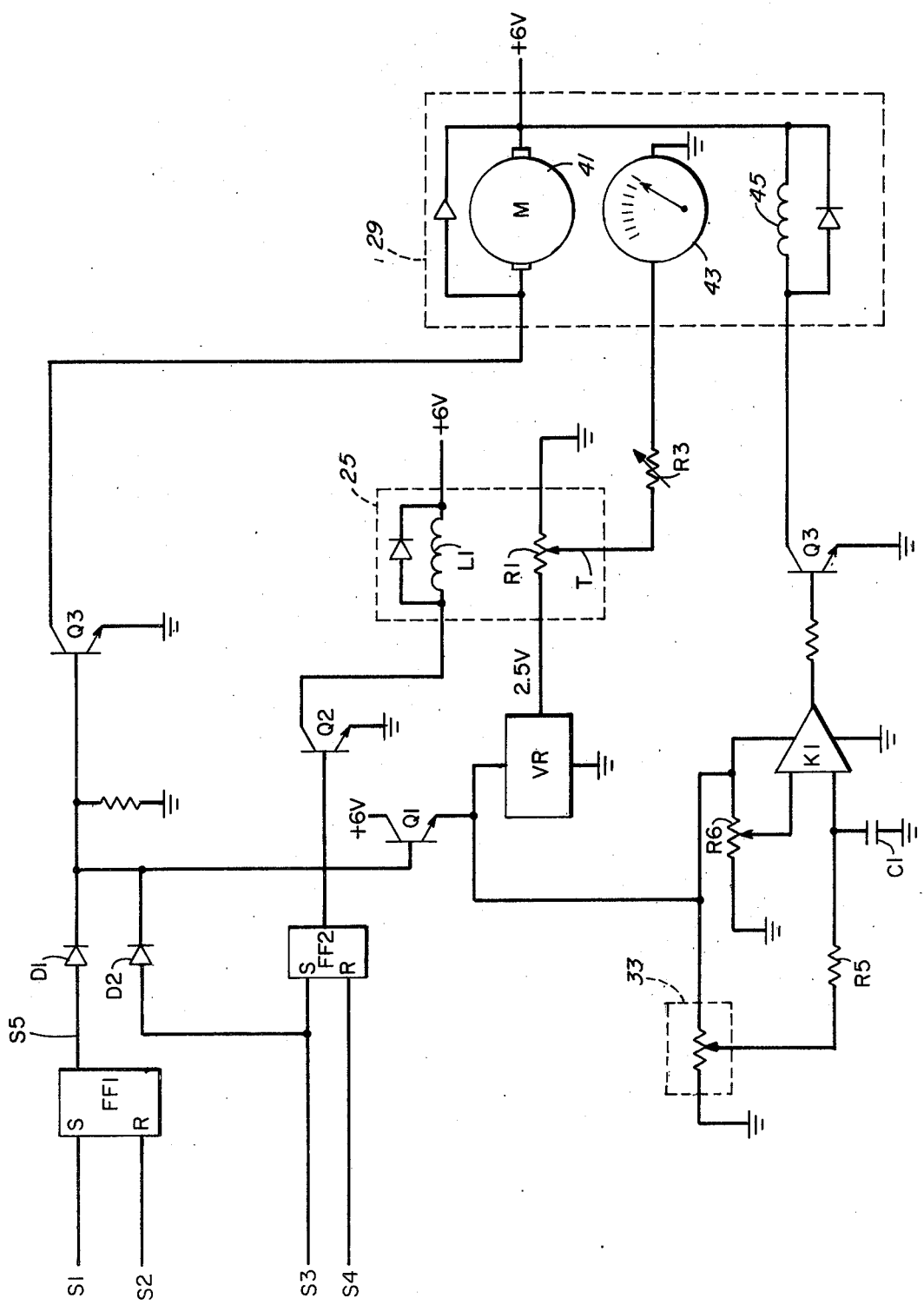
FIG. 4 is a schematic circuit diagram illustrating the method of recording information obtained from the compass and pendulum sensors employed in the spar.

Referring now to the circuit diagram of FIG. 4, the chart recorder 29 is shown as including a motor 41 for advancing the strip chart, a meter movement 43 for receiving the signal whose amplitude is to be recorded, and an event marker solenoid 45. As is understood by those skilled in the art, energization of this event marker solenoid produces a mark on the chart indicating a particular status condition or the occurrence of an event though no analog value is recorded.

The compass resistance element is indicated at R1 and the wiper carried by the compass card is indicated at T. A voltage regulator VR provides a calibrated reference potential to the resistance element R1 during selected portions of the operation cycle as described hereinafter, energization of the voltage regulator being controlled through a switching transistor Q1. This switching transistor also controls the energization of the inclinometer portion of the circuitry.

The compass solenoid which controls contact between the wiper T and resistance element R1 is indicated at L1 and the energization of this solenoid is controlled by a second switching transistor Q2. When the solenoid is energized, the compass wiper T is brought into contact with the compass resistance element R1 and the voltage generated at the wiper T is applied as the input signal to the chart recorder meter movement 43 through a calibration resistance R3.

The pendulum or inclinometer potentiometer 33 is also selectively energized from the switching transistor Q1. The variable potentials generated by the potentiometer is applied to a comparator K1 through a low-pass filter comprising a resistor R5 and capacitor C1. This filter preferably has a time constant of about five seconds for the purpose of filtering out brief transients in the inclinometer signal. A reference potential is applied to the other input of the comparator K1 by means of the potentiometer R6. Comparator K1 controls a switching transistor Q3 which in turn controls the energization of the event marker solenoid 45. Accordingly, energization of the event marker is controlled by whether the inclinometer signal is higher or lower than this reference potential.

A clock circuit 51 provides various squarewave timing signals for use in controlling the apparatus. A first signal S1 comprises a trigger pulse every 24 hours; a second signal S2 comprises a symmetrical squarewave having a period of 28 seconds; and a third signal S3 comprises a seven-second pulse every 15 minutes; and a fourth signal S4 comprises a symmetrical squarewave signal having a seven-second period. The clock circuitry forms no part of the present invention and is thus not described in detail herein, its construction being within the skill of those practiced in the art.

The S1 and S2 timing signals are applied to the SET and RESET input terminals of an SR flip-flop FFL to generate a timing signal S5 comprising pulses of 14-second duration to every 24 hours. The S3 and S4 timing signals are applied to the SET and RESET terminals of an SR flip-flop FF1 to generate a timing signal comprising a 3.5 second pulse occurring every 15 minutes and this signal is supplied to switching transistor Q2 to effect energization of the compass solenoid L1. Accordingly, it can be seen that the compass is in effect read every 15 minutes for a period of three and one-half seconds.

Timing signal S5 and the timing signal S3 are applied, through respective diodes D1 and D2, to control the switching transistor Q3 which in turn controls the energization of the chart motor 41. Accordingly, it can be seen that the chart motor is energized for seven seconds evenly 15 minutes but that once each 24 hours it will be energized for 14 seconds. As will be understood, this provides a record which can be more easily analyzed and understood. The timing signal S5 and S3 are also applied to the switching transistor Q1 which energizes the compass and the inclinometer electronics. The compass solenoid, however, is energized only during the first 3½ seconds of each seven second interval. Thus, the value recorded by the chart recorder through meter 43 will for the first 3½ seconds indicate compass heading but will then revert to zero. This form of recording allows the individual recording events to be easily recognized.

Summarizing, it can be seen that the apparatus of the present invention is operative to measure and record the direction of surface waves on a body of water. The passing wave fronts act upon the elongate spar to orient the spar parallel to the wave front, this orientation being permitted by the method of tethering which applies a restraining force essentially through the midpoint of the spar's length. Orientation of the spar with respect to the earth's magnetic field is measured by an electronic compass which is periodically energized together with a strip chart recorder to make a record of the orientation of the spar at the time of sensing. By recording also an indication of the direction of the roll of the spar, the possible 180 degree ambiguity of the spar's orientation is eliminated. Preferably, as illustrated, the recording is done on a periodic basis with a change of format on a long period basis, e.g. every 24 hours, to facilitate interpretation of the recorded results.

In view of the foregoing, it may be seen that several objects of the present invention are achieved and other advantageous results have been attained.

As various changes could be made in the above constructions without departing from the scope of the invention, it should be understood that all matter contained in the above description or shown in the accompaning drawings shall be interpreted as illustrative and not in a limiting sense.

What is claimed is:

1. Apparatus for detecting the direction of surface waves on a body of water; said apparatus comprising:
   a buoyant elongate spar;
   tether means of applying a restraining force essentialy transverse to and through the midpoint of the longitudinal axis of said spar's length; and
   compass means carried by said spar for providing a signal representing the orientation of said spar, whereby said signal provides an indication of the direction of surface waves which orient said spar.

2. Apparatus a set forth in claim 1 wherein said spar comprises a hollow tube.

3. Apparatus as set forth in claim 1 wherein said tether means include a yoke for distributing the restraining force.

4. Apparatus for detecting the direction of surface waves on a body of water; said apparatus comprising:
   a buoyant elongate spar;
   tether means for applying a restraining force essentially transverse to and through the midpoint of the longitudinal axis of said spar's length;
   compass means carried by said spar for providing a signal representing the orientation of said spar, whereby said signal provides an indication of the direction of surface waves which orient said spar; and
   inclinometer means carried by said spar for sensing the roll of said spar and providing a signal indicative thereof for resolving ambiguity in interpreting the compass signal.

5. Apparatus as set forth in claim 4 further comprising means for recording said signals as a function of time.

6. Apparatus as set forth in claim 4 wherein the displacement of said spar is less than 50% of its volume.

7. Apparatus as set forth in claim 4 wherein the volume/displacement ratio of said spar is about 10:1.

8. Apparatus for detecting the direction of surface waves on a body of water; said apparatus comprising:
   a buoyant elongate spar;
   tether means for aplying a restraining force essentially transverse to and through the midpoint of the longitudinal axis of said spar's length;
   compass means carried by said spar for providing a signal representing the orientation of said spar;
   pendulum means carried by said spar and being pivotable about an axis parallel to the length of the spar; and
   means coupled to said pendulum for providing a signal indicative of the direction of roll of said spar.

9. Apparatus for detecting the direction of surface waves on a body of water; said apparatus comprising:
   a buoyant elongate spar;
   tether means for applying a restraining force essentially transverse to and through the midpoint of the longitudinal axis of said spar's length;
   compass means carried by said spar, said compass means being periodically energizable to provide a signal having an amplitude representing the orientation of said spar at the time of energization;
   inclinometer means carried by said spar for sensing the roll of said spar and providing an electrical signal indicative thereof;
   means for filtering said electrical signal to remove transient components;
   means for comparing the filter signal with a preselected value and generating an even signal indicative of the direction of roll of said spar; and
   record making means for recording the amplitude of the compass signal during said periodic energizations together with an event marking for resolving possible ambiguity in the direction of waves which determine the spar's orientation.

10. Apparatus as set forth in claim 9 wherein the volume/displacement ratio of said spar is about 10:1.

* * * * *